(12) United States Patent
Amro et al.

(10) Patent No.: US 6,414,697 B1
(45) Date of Patent: Jul. 2, 2002

(54) METHOD AND SYSTEM FOR PROVIDING AN ICONIC PROGRESS INDICATOR

(75) Inventors: Hatim Yousef Amro, Austin; John Paul Dodson, Pflugerville, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/239,251

(22) Filed: Jan. 28, 1999

(51) Int. Cl.⁷ .................................................. G06F 3/14
(52) U.S. Cl. ..................... 345/772; 347/762; 347/765; 347/837; 347/795; 709/318; 709/328
(58) Field of Search ................................ 345/333, 334, 345/339, 348, 349, 772, 837, 762, 763, 764, 765, 795; 709/318, 328

(56) References Cited

U.S. PATENT DOCUMENTS

| | | | | |
|---|---|---|---|---|
| 5,301,348 A | * | 4/1994 | Jaaskelainen | 714/46 |
| 5,333,256 A | * | 7/1994 | Green et al. | 345/349 |
| 5,953,010 A | * | 9/1999 | Kampe | 345/348 |
| 6,038,588 A | * | 3/2000 | Nagarajayya et al. | 709/102 |
| 6,243,091 B1 | * | 6/2001 | Berstis | 345/349 |

\* cited by examiner

*Primary Examiner*—Kristine Kincaid
*Assistant Examiner*—Thomas T. Nguyen
(74) *Attorney, Agent, or Firm*—John B. Schelkopf; Joseph A. Sawyer

(57) ABSTRACT

A method and system for providing a progress indicator for an application in a computer system is disclosed. The method and system includes issuing a task request to the application, and graphically indicating a current status of the task request by a progress indicator when the application is iconified. The preferred embodiment of the present invention uses a graphical extension of the icon representing the iconified application. In this manner, the user is informed of the current status of a task request issued to the application without the need to maximize the application. This saves both time and valuable system resources.

3 Claims, 5 Drawing Sheets

METHOD AND SYSTEM FOR PROVIDING AN ICONIC PROGRESS INDICATOR

FIELD OF THE INVENTION

The present invention relates to graphical user interfaces in computer systems, and more particularly to progress indicators in graphical user interfaces.

BACKGROUND OF THE INVENTION

Many conventional computer applications use graphical user interfaces (GUI) to provide user-friendly applications. One type of GUI commonly used is the progress indicator, which is a graphical representation of the application's progress in performing a task. For example, a well known progress indicator is a horizontal bar which extends as the task progresses.

FIG. 1A illustrates a conventional computer system which uses a GUI progress indicator. The system 100 comprises a central processing unit 102 (CPU), a GUI manager 104, and a display mechanism 106, such as a computer monitor. The GUI manager 104 allows the CPU 102 to communicate graphically to the user via the display mechanism 106. For example, a user may be running an application 108a in a window environment. The application 108a is displayed on the display mechanism 106 in an applications window. Examples of applications include NETSCAPE NAVIGATOR developed by NETSCAPE and ESUITE developed by LOTUS, a division of INTERNATIONAL BUSINESS MACHINES CORPORATION. A task request is issued to the application 108a, for example, to load a particular web page. If the application 108a is maximized, it uses a GUI 110 to indicate the current status of the task. "Maximized", as used in this specification, refers to the state of the application where its window is open. For example, NETSCAPE NAVIGATOR uses roving comets in the GUI 110 while ESUITE uses a roving square. As the task is in progress, the comets or square continues to move. When the task request is completed, the comets or square stop moving. In this manner, the user is graphically informed of the current status of the task.

However, this progress indicator becomes unavailable when the application is iconified. FIG. 1B illustrates the computer system 100 with the application 108a iconified. "Iconified", as used in this specification, refers to the state of the application when its window is not open. In a window environment, iconifying the application is referred to as "minimizing" the application window. Icon 108b in FIG. 1B represents the iconified application 108a. Conventionally, the application's name is displayed on the icon 108b. Some applications replace the title with text stating, for example, x% progress completed, or some variation. However, in either case, a graphical indication of progress is unavailable.

Because of the unavailability of the graphical progress indicator, the user must maximize the application's window again in order to check on the progress of processing of the command. Maximizing the window again requires the reloading and redisplaying of all of the application's GUI parts in the window. This is both time consuming and a waste of valuable system resources. The burden becomes even greater when the GUI parts include detailed graphics, such as a Joint Photographic Experts Group (JPEG) image.

Accordingly, there exists a need for a method and system for providing a progress indicator when an application is iconified which indicates the current status of a task. The method and system should be easy to implement and should increase the efficiency of the system. The present invention addresses such a need.

SUMMARY OF THE INVENTION

A method and system for providing a progress indicator for an application in a computer system is disclosed. The method and system includes issuing a task request to the application, and graphically indicating a current status of the task request by a progress indicator when the application is iconified. The preferred embodiment of the present invention uses a graphical extension of the icon representing the iconified application. In this manner, the user is informed of the current status of a task request issued to the application without the need to maximize the application. This saves both time and valuable system resources.

DETAILED DESCRIPTION

The present invention provides a method and system for providing a progress indicator of an iconified application which indicates the current status of a task. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 2 through 4 in conjunction with the discussion below.

Figure 2:
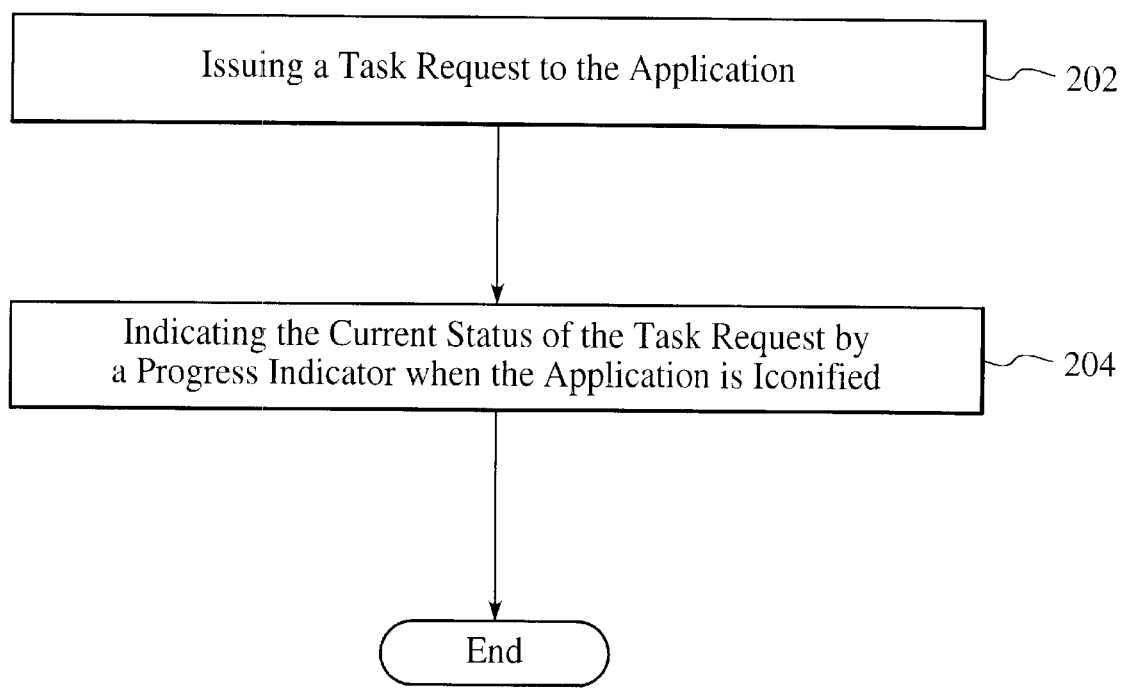
FIG. 2 is a flow chart illustrating a preferred embodiment for a method for providing an iconic progress indicator in accordance with the present invention.

FIG. 2 is a flow chart illustrating a preferred embodiment of a method for providing an iconic progress indicator in accordance with the present invention. First, a task is issued to the application, via step 202. Then, the current status of the task is indicated by a progress indicator, both when the application window is open and when the application is iconified, via step 204. Thus, unlike the conventional method, the method of the present invention provides access to the application's progress indicator even when the application window is iconified.

Figure 3:
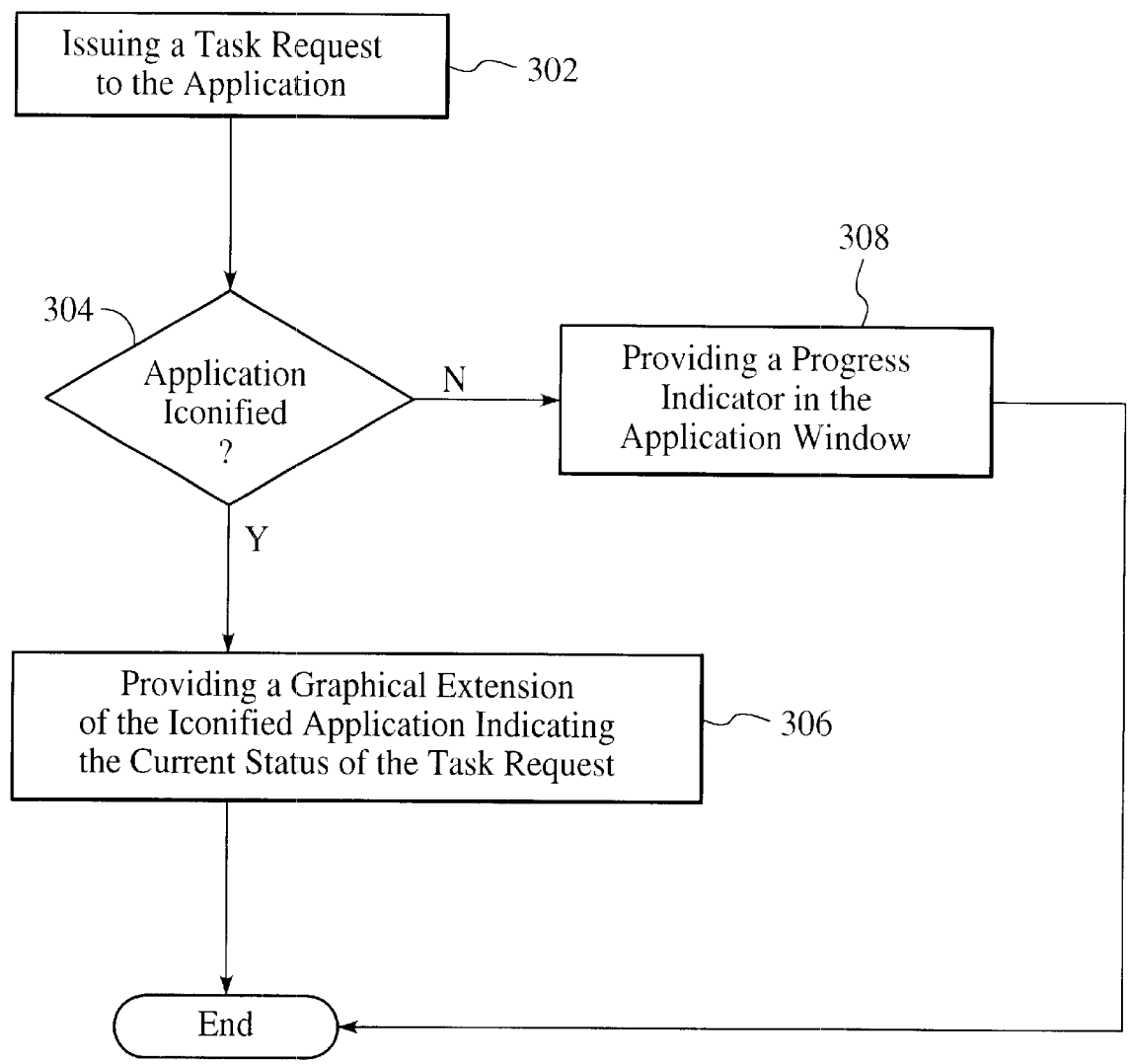
FIG. 3 is a flow chart illustrating in more detail a preferred embodiment for a method for providing an iconic progress indicator in accordance with the present invention.

FIG. 3 is a flow chart illustrating in more detail the preferred embodiment of a method for providing an iconic progress indicator in accordance with the present invention. First, the command is issued to the application, via step 302. Next, if the application is iconified, via step 304, then a graphical extension of the iconified application is provided which indicates the current status of the task request, via step 306. If the application is not iconified, a progress indicator is shown in the application window, as is already conventionally provided, via step 308.

Although the present invention is described as providing access to the application's progress indicator when the application is iconified, one of ordinary skill in the art will understand that a new progress indicator may also be provided without departing from the spirit and scope of the present invention.

Figure 1A:
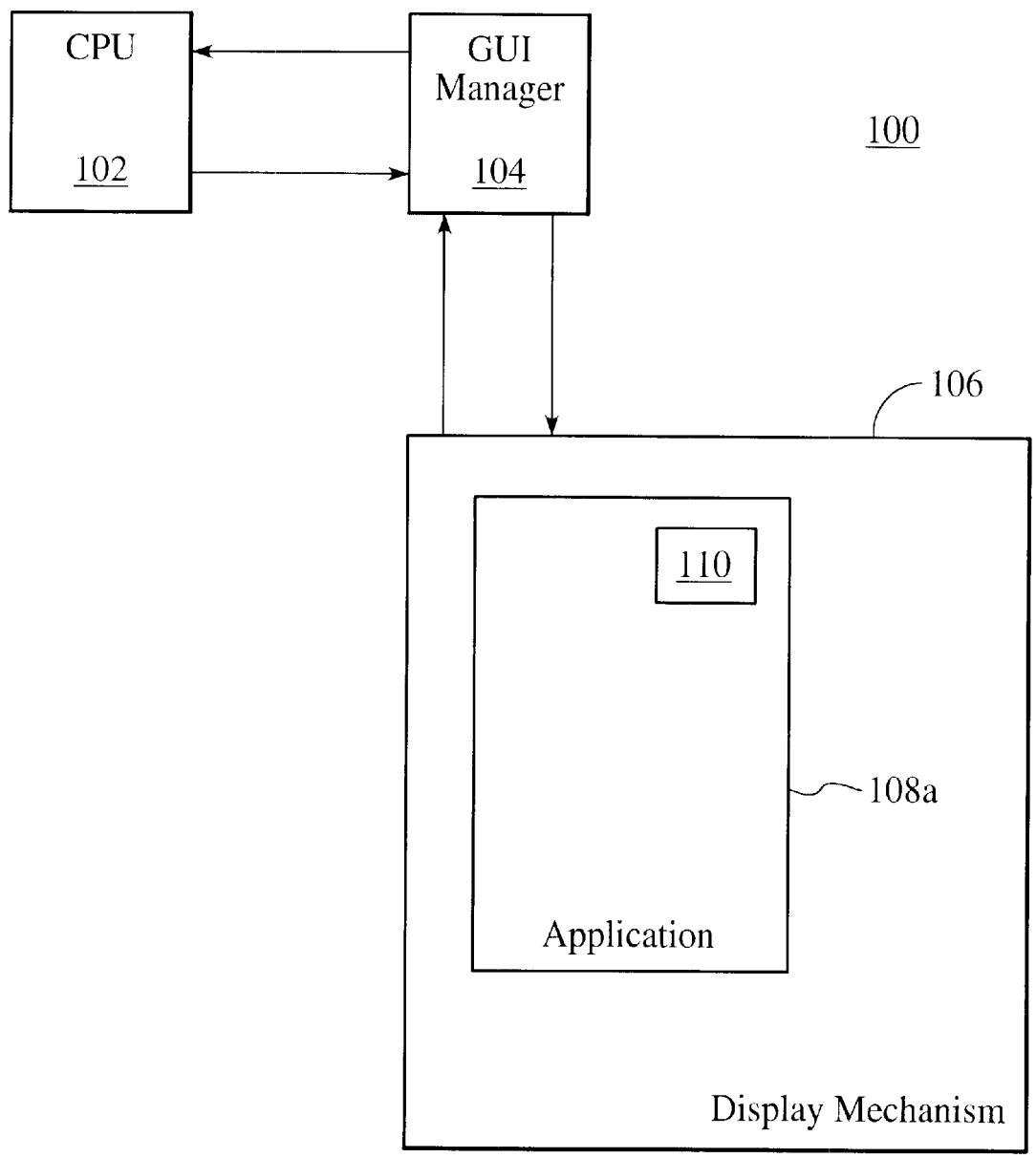
FIGS. 1A & 1B illustrate a conventional computer system utilizing a progress indicator.
Figure 1B:
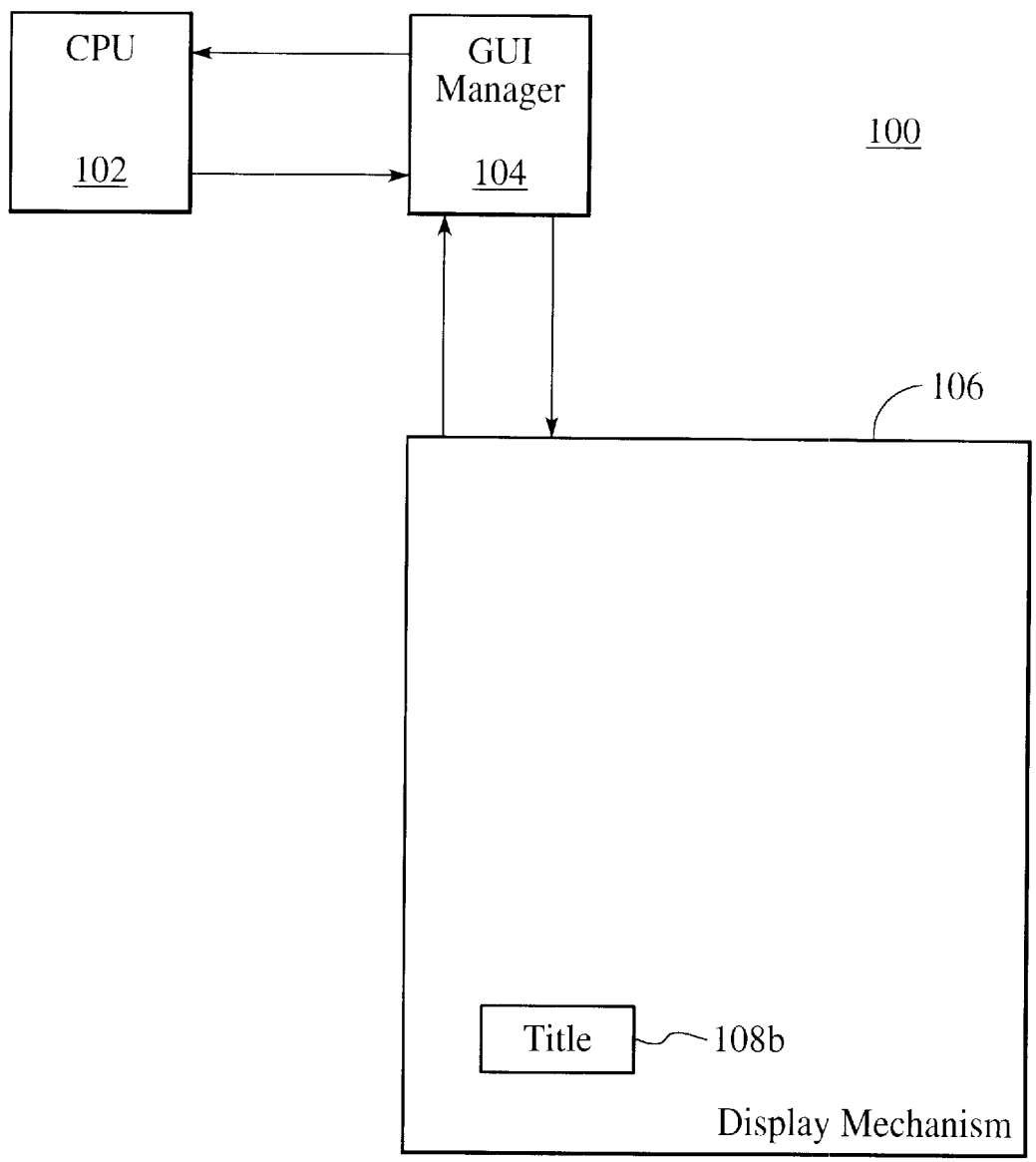
Figure 4:
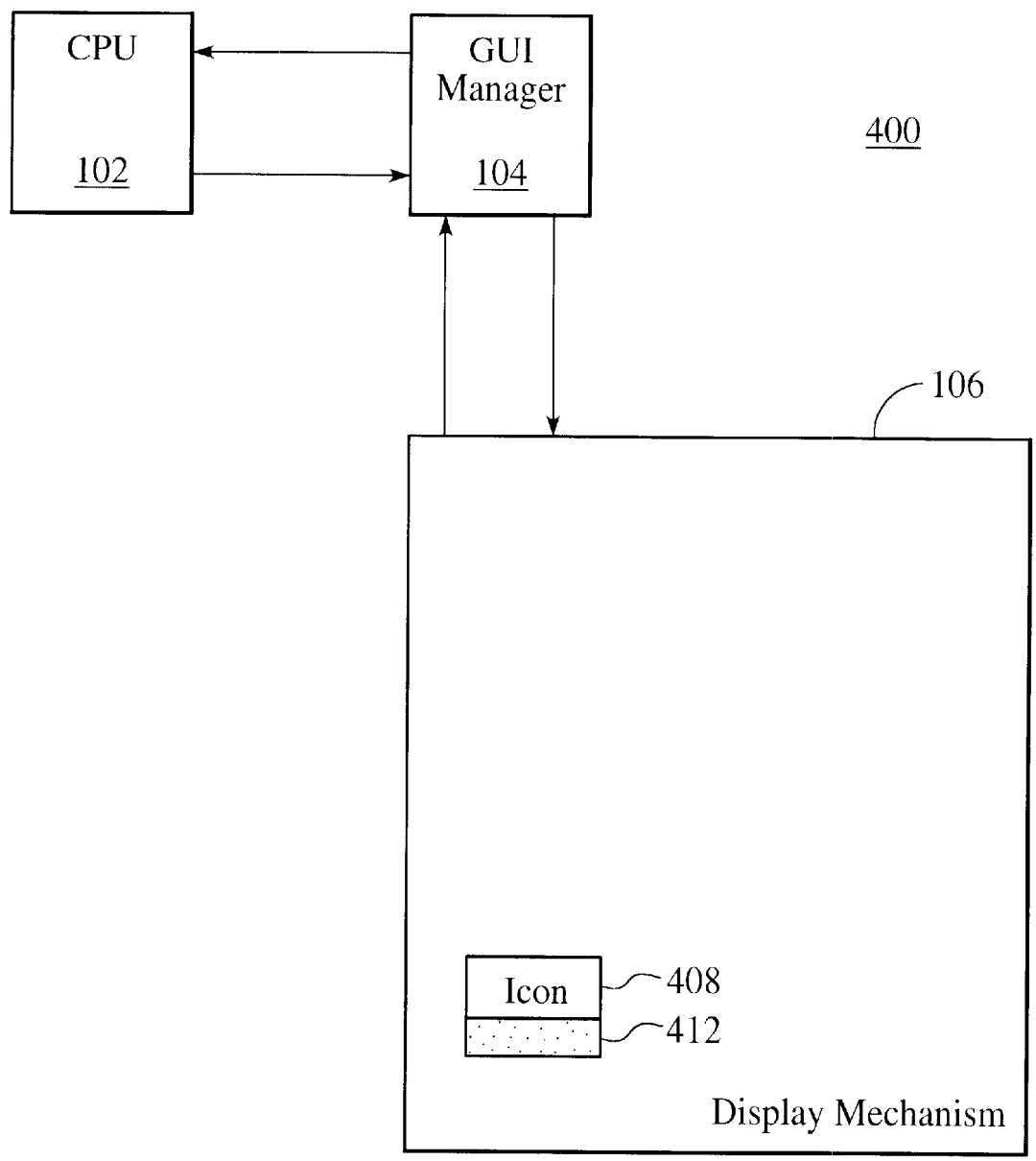
FIG. 4 illustrates a computer system utilizing the iconic progress indicator in accordance with the present invention.

FIG. 4 illustrates a preferred embodiment of a computer system which utilizes the method and system of the present invention. The computer system 400 comprises the central processing unit 102 (CPU), the graphical user interface (GUI) manager 104, and the display mechanism 106 of FIG. 1A. While in the active state, the application 108*a* is displayed with a graphical progress indicator 110, as illustrated in FIG. 1A. However, while iconified, the application is represented by an icon 408*b*, and a scaled version 412 of the progress indicator 110 is provided in a rectangular area appended to the icon 408*b*, as illustrated in FIG. 4.

For example, assume that the application 408*a* is the browser application NETSCAPE NAVIGATOR, which uses roving comets as its progress indicator when its window is active. A task is issued to the browser application 108*a*, via step 302 (FIG. 3), for example to load a particular web page. The user may wish to perform other tasks with a different application while the web page is loading since the loading of a web page may take as long as several minutes. The user then iconifies, or "minimizes", the application 108*a*. The application in this iconified state is represented by an icon 408*b*, via step 304, such as the default icon for NETSCAPE NAVIGATOR. Then, a graphical extension 412, such as roving comets, is appended to the icon 408*b*, indicating the current status of the task, via step 306. The resulting combined GUI for the inactive application in this example is the default icon for the browser application with roving comets appended to it. Thus, the graphical extension 412 provides an iconic progress indicator. In this manner, the user is informed of the current status of the task without the need to restore the application to an active state.

In the preferred embodiment, the user may program a set of preferences on how the iconic progress indicator of the present invention is displayed. For example, the user may wish for the iconic progress indicator to be visible at all times that the application is iconified, or for it to be visible only when the user positions his/her mouse over it. Other preferences may be used for the display of the iconic progress indicator without departing from the spirit and scope of the present invention.

Although the iconic progress indicator of the present invention has been described as being appended to the icon, one of ordinary skill in the art will understand that the iconic progress indicator may be placed at different locations without departing from the spirit and scope of the present invention.

Although the iconic progress indicator of the present invention has been described as a scaled version of the GUI progress indicator of the application, one of ordinary skill in the art will understand that any form or type of progress indicator may be used without departing from the spirit and scope of the present invention.

A method and system for providing an iconic progress indicator which indicates the current status of a task while the application is iconified. The preferred embodiment of the present invention uses a graphical extension of the icon representing the iconified application. In this manner, the user is informed of the current status of a task issued to the application without the need to restore the application to an active state. This saves both time and valuable system resources.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an iconic progress indicator for an application in a computer system, comprising the steps of:

a) displaying the application in a window on a display;

b) issuing a task request to the application;

c) minimizing the window, wherein the minimized window is represented by an icon; and d) graphically appending the iconic progress indicator to the icon for indicating a current status of the task requested; and wherein the icon is not altered by the iconic progress indicator;

wherein the current status is programmably displayed depending on a predetermined set of user preferences.

2. A system for providing an iconic progress indicator, comprising:

a central processing unit, running an application;

a graphical user interface manager coupled to the central processing unit; and a display mechanism coupled to the graphical user interface manager, the display mechanism displaying the application in a window, wherein the window is minimized, wherein the minimized window is represented by an icon; and graphically appending the iconic progress indicator to the icon for indicating a current status of the task request issued to the application; and wherein the icon is not altered by the iconic progress indicator;

wherein the current status is programmably displayed depending on a predetermined set of user preferences.

3. A computer readable medium with computer instructions for providing an iconic progress indicator for an application in a computer system, the instructions for:

a) displaying the application in a window on a display;

b) issuing a task request to the application;

c) minimizing the window, wherein the minimized window is represented by an icon; and d) graphically appending the iconic progress indicator to the icon for indicating a current status of the task requested; and wherein the icon is not altered by the iconic progress indicator;

wherein the current status is programmably displayed depending on a predetermined set of user preferences.

\* \* \* \* \*